United States Patent [19]
Anthony

[11] Patent Number: 6,156,203
[45] Date of Patent: *Dec. 5, 2000

[54] BIOREMEDIATION OF POLYCHLORINATED BIPHENYL POLLUTANTS WITH BUTANE-UTILIZING BACTERIA

[76] Inventor: Felix Anthony, 608 Normandy Dr., Norwood, Mass. 02062

[*] Notice: This patent is subject to a terminal disclaimer.

[21] Appl. No.: 09/275,324

[22] Filed: Mar. 24, 1999

Related U.S. Application Data

[63] Continuation-in-part of application No. 08/767,750, Dec. 17, 1996, Pat. No. 5,888,396.

[51] Int. Cl.$^7$ ..................................................... C02F 3/34
[52] U.S. Cl. ......................... 210/611; 210/620; 210/909; 435/262.5
[58] Field of Search ..................................... 210/610, 611, 210/620, 908, 909, 747; 435/262, 262.5

[56] References Cited

U.S. PATENT DOCUMENTS

| | | | |
|---|---|---|---|
| 3,846,290 | 11/1974 | Raymond | 210/610 |
| 4,713,343 | 12/1987 | Wilson, Jr. et al. | |
| 5,006,250 | 4/1991 | Roberts et al. | 210/610 |
| 5,037,551 | 8/1991 | Barkley et al. | |
| 5,057,221 | 10/1991 | Bryant et al. | |
| 5,302,286 | 4/1994 | Semprini et al. | 210/747 |
| 5,316,940 | 5/1994 | Georgiou et al. | |
| 5,326,703 | 7/1994 | Hazen et al. | |
| 5,342,769 | 8/1994 | Hunter et al. | |
| 5,384,048 | 1/1995 | Hazen et al. | |
| 5,441,887 | 8/1995 | Hanson et al. | |
| 5,814,514 | 9/1998 | Steffan et al. | |

OTHER PUBLICATIONS

Fogel, Et Al., Biodegradation of Chlorinated Ethenes by a Methane–Utilizing Mixed Culture, *Applied and Environmental Microbiology*, vol. 51, No. 4, pp. 720–724 (Apr. 1986).

Wackett Et Al., Survey of Microbial Oxygenases: Trichloroethylene Degradation by Propane–Oxidizing Bacteria, *Applied and Environmental Microbiology*, vol. 55, No. 11, pp. 2960–2964 (Nov. 1989).

Broholm Et Al., Toxicity of 1,1,1–Trichloroethane and Trichloroethene on a Mixed Culture of Methane–Oxidizing Bacteria, *Applied and Environmental Microbiology*, vol. 56, No. 8, pp. 2488–2493 (Aug. 1990).

Fox, Status and Trends in Bioremediation Treatment Technology, *Remediation*, pp. 293–303 (Summer 1991).

Alvarez–Cohen Et Al., Characterization of a Methane–Utilizing Bacterium from a Bacterial Consortium That Rapidly Degrades Trichloroethylene and Chloroform, *Applied and Environmental Microbiology*, vo. 58, No. 6, pp. 1886–1893 (Jun. 1992).

Chang Et Al., Transformation Capacities of Chlorinated Organics by Mixed Cultures Enriched on Methane, Propane, Toluene, or Phenol, *Biotechnology and Bioengineering*, vol. 45, pp. 440–449 (Nov. 9, 1994).

Kim Et Al., Aerobic Cometabolism of Chloroform and 1,1,1–Trichloroethane by Butane–Grown Microorganisms, *Bioremediation Journal*, vol. 1, No. 2, pp. 135–148 (1997).

Hamamura Et Al., Chloroform Cometabolism by Butane–Grown CF8, *Pseudomonas butanovora*, and *Mycobacterium vaccae* JOB5 and Methane–Grown *Methylosinus trichosporium* OB3b, *Applied and Environmental Microbiology*, vol. 63, No. 9, pp. 3607–3613 (Sep. 1997).

Steffan Et Al., Biodegradation of the Gasoline Oxygenates Methyl tert–Butyl Ether, Ethyl tert–Butyl Ether, and tert–Amyl Methyl Ether by Propane–Oxidizing Bacteria, *Applied and Environmental Microbiology*, vol. 63, No. 11, pp. 4216–4222, (Nov. 1997).

*Primary Examiner*—Christopher Upton
*Attorney, Agent, or Firm*—Alan G. Towner; Eckert Seamans Cherin & Mellott, LLC

[57] ABSTRACT

Butane-utilizing bacteria are used to degrade pollutants comprising polychlorinated biphenyls (PCBs). In-situ or ex-situ techniques may be used to reduce or eliminate PCB pollutants from liquid, gas and solid sources. In a preferred embodiment, PCB concentrations in various aqueous environments are reduced by contacting a contaminated water source with butane-utilizing bacteria in the presence of oxygen to degrade the PCB by cometabolism or direct metabolism. Suitable butane-utilizing bacteria include Pseudomonas, Variovorax, Nocardia, Chryseobacterium, Comamonas, Acidovorax, Rhodococcus, Aureobacterium, Micrococcus, Aeromonas, Stenotrophomonas, Sphingobacterium, Shewanella, Phyllobacterium, Clavibacter, Alcaligenes, Gordona, Corynebacterium and Cytophaga.

32 Claims, No Drawings

BIOREMEDIATION OF POLYCHLORINATED BIPHENYL POLLUTANTS WITH BUTANE-UTILIZING BACTERIA

CROSS-REFERENCE TO RELATED APPLICATION

This application is a continuation-in-part of U.S. patent application Ser. No. 08/767,750 filed Dec. 17, 1996, now U.S. Pat. No. 5,888,396 which is incorporated herein by reference.

FIELD OF THE INVENTION

The present invention relates to the degradation of pollutants, and more particularly relates to bioremediation of polychlorinated biphenyl (PCB) pollutants using butane-utilizing microorganisms.

BACKGROUND INFORMATION

PCB contaminants are persistent in the environment. Conventional remediation techniques for PCB contamination include excavation and landfilling, and incineration.

Despite conventional remediation efforts, a need still exists for the effective degradation of PCB pollutants. The present invention has been developed in view of the foregoing, and to remedy other deficiencies of the prior art.

SUMMARY OF THE INVENTION

In accordance with the present invention, butane-utilizing organisms are used to degrade PCB pollutants. Degradation may occur cometabolically or by direct metabolism. The butane-utilizing organisms of the present invention may be used for in-situ or ex-situ bioremediation of PCB contaminants contained in, for example, air, soil and groundwater waste streams. In addition, salt- and acid-tolerant butane-utilizing bacteria may be used to restore saline and low pH groundwater systems impacted by PCB contamination.

An aspect of the present invention is to provide a method of degrading PCB pollutants with butane-utilizing bacteria.

Another aspect of the present invention is to provide a method of degrading a PCB pollutant. The method includes the treatment of the PCB pollutant with butane-utilizing bacteria in the presence of butane and oxygen for a treatment time sufficient for the butane-utilizing bacteria to degrade the PCB pollutant.

Another aspect of the present invention is to provide a method of treating a site contaminated with a PCB pollutant. The method includes the steps of supplying a butane substrate to the contaminated site, and supplying an oxygen-containing gas to the contaminated site.

These and other aspects of the present invention will become more apparent from the following description.

DETAILED DESCRIPTION OF THE PREFERRED EMBODIMENTS

The present invention relates to methods for the degradation of PCB pollutants. As used herein, the term "PCB pollutants" includes pollutants comprising polychlorinated biphenyls alone, or in combination with other pollutants. Specific PCBs include compounds with a biphenyl nucleus carrying 1 to 10 chlorine atoms known as congeners. In addition to PCBs, other pollutants include chlorinated aliphatics, chlorinated aromatics and non-chlorinated aromatics. Such additional hydrocarbon pollutants include methylene chloride, 1,1-dichloroethane, chloroform, 1,2-dichloropropane, dibromochloromethane, 1,1,2-trichloroethane, 2-chloroethylvinyl ether, tetrachloroethene (PCE), chlorobenzene, 1,2-dichloroethane, 1,1,1-trichloroethane, bromodichloromethane, trans-1,3-dichloropropene, cis-1,3-dichloropropene, bromoform, benzene, toluene, ethylbenzene, xylenes, chloromethane, bromomethane, vinyl chloride, chloroethane, 1,1-dichloroethene, trans-1,2-dichloroethene, trichloroethene (TCE), dichlorobenzenes, cis-1,2-dichloroethene, dibromomethane, 1,4-dichlorobutane, 1,2,3-trichloropropane, bromochloromethane, 2,2-dichloropropane, 1,2-dibromoethane, 1,3-dichloropropane, bromobenzene, chlorotoluenes, trichlorobenzenes, trimethylbenzenes, trans-1,4-dichloro-2-butene, butylbenzenes, naphthalene, crude oil, refined oil, and Nos. 2, 4 and 6 fuel oils.

In accordance with the present invention, butane is preferably used to stimulate the growth of butane-utilizing bacteria which are effective in degrading PCB pollutants. The butane may be provided in the form of a butane substrate. The butane substrate includes liquids and/or gases in which butane is present in sufficient amounts to stimulate substantial growth of butane-utilizing bacteria. Butane is preferably the most prevalent compound of the butane substrate, on a weight percent basis. Butane typically comprises at least about 10 weight percent of the butane substrate. The other constituents of the butane substrate may include any suitable compounds, including inert gases and/or other alkanes such as methane, ethane and propane. Preferably, the butane substrate comprises at least about 50 weight percent butane, more preferably at least about 90 weight percent butane. In a particular embodiment, the butane substrate comprises at least about 99 weight percent n-butane.

The oxygen may be supplied in any suitable form, including air, pure oxygen and blends of oxygen with inert gases such as helium, argon, nitrogen, carbon monoxide and the like.

The bioremediation process of the present invention may be performed either in-situ or ex-situ to remove contaminants from various environments including aqueous systems such as groundwater, capillary fringe areas and vadose zones, and soil. Aqueous systems suitable for treatment include drinking water, groundwater, industrial waste water and the like.

According to an embodiment of the present invention, it has been discovered that butane-utilizing bacteria are extremely effective at degrading PCB pollutants. The butane-utilizing bacteria may be used to aerobically degrade PCB by cometabolism and/or direct metabolism processes.

The butane-utilizing bacteria of the present invention preferably produce oxygenase enzymes and are capable of metabolizing butane. The operative enzymes may include extracellular enzymes, intracellular enzymes and cell-bound enzymes. The butane-utilizing bacteria typically produce butane monoxygenase and/or butane dioxygenase enzymes, and in some embodiments may also be capable of producing dehalogenase enzymes which directly metabolize PCBs.

The butane-utilizing bacteria of the present invention may contain gram negative and gram positive aerobic rods and cocci, facultative anaerobic gram negative rods, non-photosynthetic, non-fruiting gliding bacteria and irregular non-sporing gram positive rods.

Of the Pseudomonadaceae family comprising gram-negative aerobic rods and cocci, species of the following genera may be suitable: Pseudomonas; Variovorax; Chryseobacterium; Comamonas; Acidovorax; Stenotrophomonas; Sphingobacterium; Xanthomonas; Frateuria; Zoogloea; Alcaligenes; Flavobacterium; Derxia; Lampropedia; Brucella; Xanthobacter; Thermus; Thennomicrobium; Halomonas; Alteromonas; Serpens; Janthinobacterium; Bordetella; Paracoccus; Beijerinckia; and Francisella.

Of the Nocardioform Actinomycetes family comprising gram-positive Eubactenia and Actinomycetes, the following genera may be suitable: Nocardia; Rhodococcus; Gordona; Nocardioides; Saccharopolyspora; Micropolyspora; Promicromonospora; Intrasporangium; Pseudonocardia; and Oerskovia.

Of the Micrococcaceae family comprising gram-positive cocci, the following genera may be suitable: Micrococcus; Stomatococcus; Planococcus; Staphylococcus; Aerococcus; Peptococcus; Peptostreptococcus; Coprococcus; Gemella; Pediococcus; Leuconostoc; Ruminococcus; Sarcina; and Streptococcus.

Of the Vibrionaceae family comprising facultative anaerobic gram-negative rods, the following genera may be suitable: Aeromonas; Photobacterium; Vibrio; Plesiomonas; Zymomonas; Chromobacterium; Cardiobacterium; Calymmatobacterium; Streptobacillus; Eikenella; and Gardnerella.

Of the Rhizobiaceae family comprising gram-negative aerobic rods and cocci, the following genera may be suitable: Phyllobacterium; Rhizobium; Bradyrhizobium; and Agrobacterium.

Of the Cytophagaceae family comprising non-photosynthetic, gliding bacteria, non-fruiting, the following genera may be suitable: Cytophaga; Flexibacter; Saprospira; Flexithrix; Herpetosiphon; Capnocytophaga; and Sporocytophaga.

Of the Corynebacterium family comprising irregular, non-sporing gram-positive rods, the following genera may be suitable: Aureobacterium; Agromyces; Arachnia; Rothia; Acetobacterium; Actinomyces; Arthrobactera; Arcanobacterium; Lachnospira; Propionibacterium; Eubacterium; Butyrivibria; Brevibacterium; Bifidobacterium; Microbacterium; Caseobacter; and Thermoanaerobacter.

The following isolation techniques were used for obtaining pure and mixed cultures of various methane-, propane- and butane-utilizing bacteria. Enrichment procedures were used to increase bacterial population for a given growth substrate. Soil samples collected from a variety of sites underwent enrichment transfers weekly for a period of one year. The methods and materials used for the enrichment studies are described below.

Soil samples were collected with a stainless-steel hand auger at depths that varied between one to two feet. The soils samples were stored in dedicated glass containers and moistened with sterile deionized/distilled water for transport to the laboratory. The hand auger was decontaminated between sampling locations with three Alconox soap/distilled water rinses. Soil samples used as inocula were collected from the locations summarized in Table 1.

TABLE 1

| Sample Number/Matrix | Sample Location |
|---|---|
| 1/soil | Landfill cell |
| 2/soil | #2 fuel oil impacted soil |
| 3/soil | Landfill cell |
| 4/soil | Gasoline and waste oil impacted soils |
| 5/soil | Shallow freshwater lagoon |
| 6/soil | Salt marsh |

TABLE 1-continued

| Sample Number/Matrix | Sample Location |
|---|---|
| 7/soil | Industrial outfall |
| 8/soil | #2 fuel oil impacted soil |

Cultures were transferred weekly for a period of one year in liquid media to increase the relative numbers of methane-, propane- and butane-utilizing bacteria. The liquid media was a mineral salts media (MSM) prepared from the following chemicals:

| | |
|---|---|
| $MgSO_4$-$7H_2O$ | 1.0 g; |
| $CaCl_2$ | 0.2 g; |
| $NH_4Cl$ | 0.5 g; |
| $FeCl_3$$6H_2O$ | 4.0 mg; |
| Trace elements solution | 0.5 ml; and |
| Distilled water | 900 ml. |

A trace elements solution, which provides micronutrients for bacterial growth, was prepared comprising the following ingredients:

| | |
|---|---|
| $ZnCl_2$ | 5.0 mg; |
| $MnCl_2$-$4H_2O$ | 3.0 mg; |
| $H_3BO_4$ | 30.0 mg; |
| $NiCl_2$-$6H_2O$ | 2.0 mg; |
| $(NH_4)_6Mo_7O_{24}$-$4_2O$ | 2.25 mg; and |
| Distilled water | 1000 ml. |

The pH of the MSM was adjusted to 6.8 before autoclaving (20 min at 121 degree C.) with 20.0 ml of a phosphate buffer solution comprising 3.6 g of $Na_2HPO_4$ and 1.4 g of $KH_2PO_4$ in 100 ml of distilled water. After autoclaving the MSM and the buffer solution, another 2.0 ml of the buffer solution was added to the MSM when the temperature of the media reached 60 degree C. The MSM cocktail was completed with the addition of 4.0 mg of casamino acids and 4.0 mg of yeast (Difco) dissolved in 100 ml of distilled water. The nutrient solution was filter sterilized by vacuum filtration through a 0.2 micron filter (Gelman) prior to addition to the MSM.

Prior to the first enrichment transfer, the inocula from the eight sampling locations summarized in Table 1 underwent a series of pre-treatments. The first two pre-treatments were conducted on the original soil materials used as inocula. The last two treatments were applied as MSM alterations during the weekly transfers. The pre-treatments consisted of the following: (1) 30% ethanol saturation rinse followed by a sterile phosphate buffer rinse (ethanol); (2) 60° C. water bath for 15 minutes (heat); (3) no treatment (no-treat); (4) MSM containing 10% aqueous solution of sodium chloride (10% NaCl); and (5) MSM with pH of 2.0 (pH of 2). Treatment Nos. (4) and (5) were employed in an attempt to locate extreme halophiles and acidophiles capable of utilizing hydrocarbons as a growth substrate.

The first enrichment transfers for each sample series were conducted in 72 ml serum bottles (Wheaton) with 20 ml of MSM and 1.0 g of inocula. Subsequent culture transfers (5.0 ml) were conducted with sterilized plastic syringes (B&D). The bottles were capped with red rubber plugs and crimped with aluminum seals (Wheaton). Each sample was handled aseptically and all glassware, materials and supplies were sterilized by autoclaving. Table 2 summarizes the enrichment transfer schedule and the concentration of methane or propane replaced in the headspace of each serum bottle using a dedicated gas tight syringe (Hamilton) with a Fisher Scientific inert sampling valve (on/off lever) to control gas loss from the needle tip between each transfer.

TABLE 2

| Sample No. | Pre-Treatment | Food Source | Sample ID |
|---|---|---|---|
| 1 | ethanol | methane | 1EM |
| 1 | heat | methane | 1HM |
| 1 | no-treat | methane | 1NM |
| 1 | 10% NaCl | methane | 1SM |
| 1 | pH of 2.0 | methane | 1AM |
| 1 | ethanol | propane | 1EP |
| 1 | heat | propane | 1HP |
| 1 | no-treat | propane | 1NP |
| 1 | 10% NaCl | propane | 1SP |
| 1 | pH of 2.0 | propane | 1AP |

The amount of oxygen required for mineralization of methane, propane and butane can be derived from the following equations.

$$CH_4 + 2O_2 = CO_2 + 2H_2O \qquad 2:1$$

$$C_3H_8 + 5O_2 = 3CO_2 + 4H_2O \qquad 5:1$$

$$C_4H_{10} + 6.5O_2 = 4CO_2 + 5H_2O \qquad 6.5:1$$

Table 2 summarizes the entire set of enrichment transfers prepared for Sample No. 1. The first sample series did not include a butane treatment. The remaining seven samples were prepared in identical fashion and, in addition, contained a butane treatment series, as shown in Tables 3 through 9. A control (serum bottle with sterilized MSM only) was maintained for each sample series.

All hydrocarbon gases described herein were research grade quality (Scott Specialty Gases). Methane was added at a concentration of 27% (vol/vol), propane at 10% and butane at 6%. After the first six months of enrichment transfers, the concentrations were reduced to 13% for methane and 9% for propane. The concentration of butane remained the same at 6%.

TABLE 3

| Sample No. | Pre-Treatment | Food Source | Sample ID |
|---|---|---|---|
| 2 | ethanol | methane | 2EM |
| 2 | heat | methane | 2HM |
| 2 | no-treat | methane | 2NM |
| 2 | 10% NaCl | methane | 2SM |
| 2 | pH of 2.0 | methane | 2AM |
| 2 | ethanol | propane | 2EP |
| 2 | heat | propane | 2HP |
| 2 | no-treat | propane | 2NP |
| 2 | 10% NaCl | propane | 2SP |
| 2 | pH of 2.0 | propane | 2AP |
| 2 | ethanol | butane | 2EB |
| 2 | heat | butane | 2HB |
| 2 | no-treat | butane | 2NB |
| 2 | 10% NaCl | butane | 2SB |
| 2 | pH of 2.0 | butane | 2AB |

TABLE 4

| Sample No. | Pre-Treatment | Food Source | Sample ID |
|---|---|---|---|
| 3 | ethanol | methane | 3EM |
| 3 | heat | methane | 3HM |
| 3 | no-treat | methane | 3NM |
| 3 | 10% NaCl | methane | 3SM |
| 3 | pH of 2.0 | methane | 3AM |
| 3 | ethanol | propane | 3EP |
| 3 | heat | propane | 3HP |
| 3 | no-treat | propane | 3NP |
| 3 | 10% NaCl | propane | 3SP |
| 3 | pH of 2.0 | propane | 3AP |
| 3 | ethanol | butane | 3EB |
| 3 | heat | butane | 3HB |
| 3 | no-treat | butane | 3NB |
| 3 | 10% NaCl | butane | 3SB |
| 3 | pH of 2.0 | butane | 3AB |

TABLE 5

| Sample No. | Pre-Treatment | Food Source | Sample ID |
|---|---|---|---|
| 4 | ethanol | methane | 4EM |
| 4 | heat | methane | 4HM |
| 4 | no-treat | methane | 4NM |
| 4 | 10% NaCl | methane | 4SM |
| 4 | pH of 2.0 | methane | 4AM |
| 4 | ethanol | propane | 4EP |
| 4 | heat | propane | 4HP |
| 4 | no-treat | propane | 4NP |
| 4 | 10% NaCl | propane | 4SP |
| 4 | pH of 2.0 | propane | 4AP |
| 4 | ethanol | butane | 4EB |
| 4 | heat | butane | 4HB |
| 4 | no-treat | butane | 4NB |
| 4 | 10% NaCl | butane | 4SB |
| 4 | pH of 2.0 | butane | 4AB |

TABLE 6

| Sample No. | Pre-Treatment | Food Source | Sample ID |
|---|---|---|---|
| 5 | ethanol | methane | 5EM |
| 5 | heat | methane | 5HM |
| 5 | no-treat | methane | 5NM |
| 5 | 10% NaCl | methane | 5SM |
| 5 | pH of 2.0 | methane | 5AM |
| 5 | ethanol | propane | 5EP |
| 5 | heat | propane | 5HP |
| 5 | no-treat | propane | 5NP |
| 5 | 10% NaCl | propane | 5SP |
| 5 | pH of 2.0 | propane | 5AP |
| 5 | ethanol | butane | 5EB |
| 5 | heat | butane | 5HB |
| 5 | no-treat | butane | 5NB |
| 5 | 10% NaCl | butane | 5SB |
| 5 | pH of 2.0 | butane | 5AB |

TABLE 7

| Sample No. | Pre-Treatment | Food Source | Sample ID |
|---|---|---|---|
| 6 | ethanol | methane | 6EM |
| 6 | heat | methane | 6HM |
| 6 | no-treat | methane | 6NM |
| 6 | 10% NaCl | methane | 6SM |
| 6 | pH of 2.0 | methane | 6AM |
| 6 | ethanol | propane | 6EP |
| 6 | heat | propane | 6HP |
| 6 | no-treat | propane | 6NP |
| 6 | 10% NaCl | propane | 6SP |
| 6 | pH of 2.0 | propane | 6AP |
| 6 | ethanol | butane | 6EB |
| 6 | heat | butane | 6HB |

TABLE 7-continued

| Sample No. | Pre-Treatment | Food Source | Sample ID |
|---|---|---|---|
| 6 | no-treat | butane | 6NB |
| 6 | 10% NaCl | butane | 6SB |
| 6 | pH of 2.0 | butane | 6AB |

TABLE 8

| Sample No. | Pre-Treatment | Food Source | Sample ID |
|---|---|---|---|
| 7 | ethanol | methane | 7EM |
| 7 | heat | methane | 7HM |
| 7 | no-treat | methane | 7NM |
| 7 | 10% NaCl | methane | 7SM |
| 7 | pH of 2.0 | methane | 7AM |
| 7 | ethanol | propane | 7EP |
| 7 | heat | propane | 7HP |
| 7 | no-treat | propane | 7NP |
| 7 | 10% NaCl | propane | 7SP |
| 7 | pH of 2.0 | propane | 7AP |
| 7 | ethanol | butane | 7EB |
| 7 | heat | butane | 7HB |
| 7 | no-treat | butane | 7NB |
| 7 | 10% NaCl | butane | 7SB |
| 7 | pH of 2.0 | butane | 7AB |

TABLE 9

| Sample No. | Pre-Treatment | Food Source | Sample ID |
|---|---|---|---|
| 8 | ethanol | methane | 8EM |
| 8 | heat | methane | 8HM |
| 8 | no-treat | methane | 8NM |
| 8 | 10% NaCl | methane | 8SM |
| 8 | pH of 2.0 | methane | 8AM |
| 8 | ethanol | propane | 8EP |
| 8 | heat | propane | 8HP |
| 8 | no-treat | propane | 8NP |
| 8 | 10% NaCl | propane | 8SP |
| 8 | pH of 2.0 | propane | 8AP |
| 8 | ethanol | butane | 8EB |
| 8 | heat | butane | 8HB |
| 8 | no-treat | butane | 8NB |
| 8 | 10% NaCl | butane | 8SB |
| 8 | pH of 2.0 | butane | 8AB |

After the first two weeks of enrichment transfers, all liquid suspensions, with the exception of the 10% NaCl treatments, the 2.0 pH treatments and the controls, demonstrated a significant increase in turbidity.

After conducting the enrichment transfers for 25 weeks, morphological descriptions and direct cell counts were compiled for all isolates. Morphological descriptions of the isolates were compiled using an Olympus BH-2 Phase Contrast Microscope. In addition, a Bright Line Hemacytometer (Fisher Scientific) was used to enumerate cell densities by the direct count method. Table 10 summarizes the descriptions and cell density enumerations. Serum bottles of sterilized MSM were maintained as controls.

TABLE 10

| Sample ID | Morphology | Enumeration (cells/ml) |
|---|---|---|
| 1EM | cocci | 2.5E8 |
| 1HM | cocci/bacilli | 1.8E8 |
| 1NM | bacilli | 1.3E8 |
| 1SM | cocci | 5.8E6 |
| 1AM | cocci | 3.8E6 |
| 1EP | bacilli | 4.0E6 |
| 1HP | cocci | 1.3E7 |
| 1NP | bacilli | 9.8E6 |
| 1SP | diplococci | 4.0E6 |
| 1AP | bacilli (variable) | 1.5E6 |
| 2EM | cocci/bacilli | 1.2E8 |
| 2HM | cocci/bacilli | 7.3E7 |
| 2NM | streptococci/bacilli | 1.1E8 |
| 2SM | comma-shaped | 6.6E7 |
| 2AM | comma-shaped | 8.3E6 |
| 2EP | bacilli | 1.2E8 |
| 2HP | bacilli/comma-shaped | 1.8E8 |
| 2NP | bacilli (variable) | 1.1E8 |
| 2SP | cocci | 7.0E6 |
| 2AP | cocci | 3.3E6 |
| 2EB | cocci/bacilli | 2.1E8 |
| 2HB | bacilli (variable) | 2.5E8 |
| 2NB | cocci/comma-shaped | 1.9E8 |
| 2SB | bacilli | 2.5E6 |
| 2AB | cocci | 3.0E6 |
| 3EM | cocci/bacilli | 1.4E8 |
| 3HM | cocci | 1.2E8 |
| 3NM | cocci | 5.8E7 |
| 3SM | cocci | 7.5E5 |
| 3AM | cocci | 7.5E5 |
| 3EP | bacilli | 7.8E7 |
| 3HP | bacilli | 3.0E7 |
| 3NP | bacilli | 7.1E7 |
| 3SP | cocci | 1.0E6 |
| 3AP | bacilli | 2.5E5 |
| 3EB | bacilli (variable) | 1.5E8 |
| 3HB | cocci/bacilli | 3.1E7 |
| 3NB | cocci | 3.1E8 |
| 3SB | cocci (irregular) | 1.7E7 |
| 3AB | cocci/bacilli | 2.5E5 |
| 4EM | cocci (variable) | 1.6E8 |
| 4HM | diplococci | 3.1E8 |
| 4NM | cocci | 1.6E8 |
| 4SM | cocci | 1.3E6 |
| 4AM | bacilli | 2.5E5 |
| 4EP | bacilli (variable) | 1.0E8 |
| 4HP | bacilli (variable) | 2.2E8 |
| 4NP | cocci | 1.3E8 |
| 4SP | cocci | 1.5E6 |
| 4AP | cocci/bacilli | 6.5E6 |
| 4EB | bacilli | 3.6E8 |
| 4HB | bacilli (variable) | 4.8E8 |
| 4NB | bacilli | 2.6E8 |
| 4SB | comma-shaped | 1.3E6 |
| 4AB | cocci | 1.0E6 |
| 5EM | cocci (variable) | 1.3E8 |
| 5HM | cocci | 1.4E8 |
| 5NM | cocci | 2.4E8 |
| 5SM | no cells | 0.0 |
| 5AM | no cells | 0.0 |
| 5EP | cocci (variable) | 5.1E7 |
| 5HP | bacilli | 3.2E7 |
| 5NP | streptococci | 2.1E8 |
| 5SP | cocci (variable) | 2.8E6 |
| SAP | bacilli | 5.0E5 |
| 5EB | bacilli | 3.1E8 |
| 5HB | cocci | 3.2E7 |
| 5NB | cocci | 1.6E8 |
| 5SB | bacilli | 1.0E6 |
| 5AB | cocci | 2.5E6 |
| 6EM | bacilli (variable) | 1.7E8 |
| 6HM | cocci | 2.6E8 |
| 6NM | cocci/spirochetes | 1.3E8 |
| 6SM | cocci (variable) | 1.3E6 |
| 6AM | cocci (variable) | 2.0E6 |
| 6EP | bacilli | 2.8E7 |
| 6HP | bacilli | 1.3E8 |
| 6NP | bacilli/spirochetes | 2.0E8 |
| 6SP | cocci (variable) | 3.5E6 |
| 6AP | cocci (variable) | 5.0E5 |
| 6EB | cocci | 3.5E7 |

TABLE 10-continued

| Sample ID | Morphology | Enumeration (cells/ml) |
|---|---|---|
| 6HB | bacilli | 1.3E8 |
| 6NB | bacilli | 4.8E7 |
| 6SB | cocci | 2.3E6 |
| 6AB | cocci | 3.3E6 |
| 7EM | streptococci | 1.3E8 |
| 7HM | staphylococci | 3.2E7 |
| 7NM | cocci/bacilli | 3.1E8 |
| 7SM | cocci (variable) | 3.0E6 |
| 7AM | cocci (variable) | 4.0E6 |
| 7EP | bacilli | 1.4E8 |
| 7HP | bacilli | 4.1E8 |
| 7NP | bacilli | 3.5E8 |
| 7SP | cocci (variable) | 1.2E7 |
| 7AP | cocci (variable) | 1.5E6 |
| 7EB | bacilli (variable) | 1.6E8 |
| 7HB | bacilli (variable) | 3.9E8 |
| 7NB | bacilli | 4.2E8 |
| 7SB | cocci (variable) | 4.3E6 |
| 7AB | cocci (variable) | 2.8E6 |
| 8EM | cocci | 5.6E7 |
| 8HM | cocci | 6.1E7 |
| 8NM | cocci | 5.7E7 |
| 8SM | cocci (variable) | 5.3E6 |
| 8AM | bacilli | 2.3E6 |
| 8EP | bacilli | 1.4E8 |
| 8HP | cocci | 3.8E8 |
| 8NP | cocci | 2.9E8 |
| 8SP | square-shaped | 6.5E6 |
| 8AP | cocci (variable) | 3.8E6 |
| 8EB | bacilli | 1.3E8 |
| 8HB | bacilli/streptococci | 9.8E7 |
| 8NB | bacilli (variable) | 1.2E8 |
| 8SB | bacilli (variable) | 2.0E6 |
| 8AB | cocci (variable) | 2.8E6 |
| Control-1 | no cells | 0.0 |
| Control-2 | no cells | 0.0 |
| Control-3 | no cells | 0.0 |

Sample ID strains 3NB and 6NB were placed on deposit with the American Type Culture Collection (ATCC), Rockville, MD on Aug. 22, 1996, under ATCC designation numbers 55808 and 55809, respectively.

PCBs are heavily chlorinated benzene rings which, in accordance with the present invention, may be degraded via cometabolism by oxygenase enzyme systems. Butane biostimulation may be a viable treatment for the following class of compounds: PCB congeners; pesticides such as atrazine, chlordane, lindane, and 1,1,1-trochloro-2,2 -bis(4-chlorophenyl)ethane (DDT); PAHs such as trimethylbenzenes, naphthalene and anthracene; dioxins; and chlorophenols and pentachlorophenols.

Soil samples were collected from a hazardous waste site in Massachusetts. The soil in the contaminated area had been impacted by a release of Aroclor 1248, a PCB congener. Ten-gram samples of soil with a history of Aroclor 1248 contamination were placed in four 120-ml serum bottles after blending. Each sample was handled aseptically, and all glassware, materials and supplies were sterilized by autoclaving. Butane was replaced in the headspace of each serum bottle using a dedicated, sterile, gas tight syringe with inert sampling valve (on/off lever). Butane was added at a concentration of 6% (vol/vol). Each week, for a period of 19 weeks, the headspace in each serum bottle was replaced and respiked with a 6% (vol/vol) concentration of butane. After the 12-week period, the soil samples were blended in sterile mixing bowls and analyzed using a gas chromatograph equipped with an ECD detector. The results are summarized in Table 11.

TABLE 11

| Serum Bottle | Aroclor 1248 Initial Concentration Week 0 | Aroclor 1248 Final Concentration Week 19 |
|---|---|---|
| A | 10.58 ppm | 4.46 ppm |
| B | 9.50 ppm | 3.00 ppm |
| C | 7.34 ppm | 1.90 ppm |
| D - Control | 9.97 ppm | 8.46 ppm |

After treatment in accordance with the present invention, PCB levels are reduced significantly. For example, the concentration of PCBs in soil may initially be from less than 10 ppm to more than 10,000 ppm. Upon treatment by the present method, PCB concentrations in soil are typically reduced to levels below about 50 ppm. PCB concentrations in soil are preferably reduced to less than about 5 ppm, more preferably less than about 2 ppm, and most preferably to less than about 1 ppm. The concentration of PCBs in water is preferably reduced to levels below about 10 ppb, more preferably below about 0.5 ppb, with the present process.

As a food source for microbial consumption, butane has been found to be a superior substrate to methane or propane due to its solubility factor. Methane and propane are characterized as slightly soluble in water, while butane is characterized as very soluble in water. At 17 degrees centigrade, 3.5 ml of methane and 6.5 ml of propane dissolves in 100 ml of water. In contrast, 15 ml of butane dissolves in 100 ml of water. Higher solubility increases microbial access to the growth substrate for metabolism, and may produce reaction rates demonstrating first order kinetics. PCBs are highly chlorinated benzene rings consisting of a biphenyl nucleus carrying 1 to 10 chlorine atoms. Methane is a small single tetrahedral carbon molecule, while propane is a three carbon molecule. On the other hand, butane is a large non-planar four carbon molecule. While not intending to be bound by any particular theory, molecular structure, reactive surface area and size may play a role in causing the operative enzymes of the butane oxidizers to be superior PCB degraders. Furthermore, while methane-utilizing bacteria are typically sensitive to normal oxygen tension of an air atmosphere and require decreased oxygen levels for growth, the butane-utilizing bacteria of the present invention are not sensitive to ambient oxygen tension and can be used with normal atmospheres. In addition, the butane-utilizers do not exhibit copper toxicity, and do not require carbon dioxide as a supplementary carbon source.

Various propane-utilizing and butane-utilizing bacteria were characterized as follows. Microorganism identification is based on the Similarity Index. The Similarity Index in the Microbial Identification System (MIS) is a numerical value which expresses how closely the fatty acid composition of an unknown sample compares with the mean fatty acid methyl ester composition of the strains used to create the library entry listed as its match. The database search presents the best matches and associated similarity indices. An exact match of the fatty acid make-up of the unknown sample to the mean of a library entry results in a similarity index of 1.000. The similarity index will decrease as each fatty acid varies from the mean percentage. Strains with a similarity of 0.500 or higher and with a separation of 0.100 between first and second choice are good matches (good or excellent). A similarity index between 0.300 and 0.500 may be a good match but would indicate an atypical strain (OK). Values lower than 0.300 suggest that the species is not in the database but those listed provide the most closely related species (weak or poor).

In the cases where a strain remained unidentified after fatty acid analysis, the Biolog system was employed where microorganisms are identified by comparing substrate utilization characteristics of the unknown isolate to the Biolog database.

The following isolates were chosen for identification at two independent laboratories: propane-utilizers 2EP, 3EP, 4HP, 6HP, 6NP and 8NP; and butane-utilizers 2EB, 2HB, 3EB, 3NB, 4EB, 4HB, 4NB, 5EB, 6HB, 6NB and 7NB.

The majority of the propane-utilizers and butane-utilizers were characterized as different genera/species by both laboratories for the comparison-pair isolates 2EP-2EB, 3EP-3EB, 4HP-4HB, 6HP-6HB, and 6NP-6NB, thus indicating that the butane-utilizers are a distinct class of microorganism from the propane degraders. Since methane-utilizing bacteria are obligate methane oxidizers, no isolates from the methane microcosms were submitted for laboratory analysis. Most isolates from the microcosms were mixed. Between both laboratories, 59 genus/specie were identified with "good or excellent" precision, 14 with "OK" precision (atypical strains) and 22 with "weak" precision (species not in database and remain as unknowns). A summary of the butane-utilizers that may have the ability to degrade PCBs are identified in Table 12.

TABLE 12

| Sample ID | Genus | Species |
|---|---|---|
| 2HB* | Pseudomonas | putida |
| 2EB | Pseudomonas | rubrisubalbicans |
| 3EB | Pseudomonas | rubrisubalbicans |
| 5EB | Pseudomonas | aeruginosa |
| 6NB | Pseudomonas | aeruginosa |
| 2EB | Variovorax | paradoxus |
| 2HB | Variovorax | paradoxus |
| 3EB | Variovorax | paradoxus |
| 3NB | Variovorax | paradoxus |
| 4HB | Variovorax | paradoxus |
| 4NB | Variovorax | paradoxus |
| 5EB* | Variovorax | paradoxus |
| 6HB | Variovorax | paradoxus |
| 2EB | Variovorax | paradoxus** |
| 6NB | Variovorax | paradoxus*** |
| 7NB | Nocardia | asteroides |
| 2HB | Nocardia | asteroides*** |
| 3EB | Nocardia | asteroides*** |
| 4HB* | Nocardia | asteroides*** |
| 4NB | Nocardia | asteroides*** |
| 7NB | Nocardia | asteroides*** |
| 5EB* | Nocardia | brasiliensis |
| 2EB | Nocardia | restricta |
| 2HB | Nocardia | globerula |
| 2HB | Chryseobacterium | indologenes |
| 4HB | Chryseobacterium | indologenes |
| 7NB | Chryseobacterium | indologenes |
| 5EB | Chryseobacterium | meningosepticum |
| 2EB | Comamonas | acidovorans |
| 3NB | Comamonas | acidovorans |
| 6HB | Comamonas | acidovorans |
| 6NB | Comamonas | acidovorans |
| 4EB | Acidovorax | delafieldii |
| 4NB | Acidovorax | delafieldii |
| 6NB | Acidovorax | delafieldii |
| 4NB | Rhodococcus | rhodochrous |
| 7NB | Rhodococcus | rhodochrous |
| 2EB | Rhodococcus | erythropolis |
| 3EB | Rhodococcus | erythropolis |
| 6HB | Rhodococcus | erythropolis |
| 4EB* | Rhodococcus | fascians |
| 5EB* | Rhodococcus | fascians |
| 4NB | Aureobacterium | barkeri |
| 4HB | Aureobacterium | esteroaromaticum |
| 4NB | Aureobacterium | esteroaromaticum |
| 6HB | Aureobacterium | saperdae |
| 5EB | Micrococcus | varians |

TABLE 12-continued

| Sample ID | Genus | Species |
|---|---|---|
| 7NB | Micrococcus | varians |
| 7NB | Micrococcus | kristinae |
| 6HB | Aeromonas | caviae |
| 6NB | Aeromonas | caviae |
| 2EB | Stenotrophomonas | maltophilia |
| 3EB | Stenotrophomonas | maltophilia |
| 4EB | Stenotrophomonas | maltophilia |
| 5EB | Stenotrophomonas | maltophilia |
| 6HB | Stenotrophomonas | maltophilia |
| 6NB | Stenotrophomonas | maltophilia |
| 4EB | Sphingobacterium | thalpophilum |
| 4NB* | Sphingobacterium | spiritivorum |
| 4NB | Shewanella | putrefaciens B |
| 3NB* | Phyllobacterium | myrsinacearum |
| 6HB | Clavibacter | michiganense |
| 6HB | Clavibacter | michiganense**** |
| 6NB | Alcaligenes | xylosoxydans |
| 7HB* | Gordona | terrae |
| 7NB | Corynebacterium | aquaticum B |
| 7NB | Cytophaga | johnsonae |

* =low similarity index indicating a poor match with the fatty-acid database. In these cases, the species in the consortia listed was matched to a database testing substrate utilization and remained unidentified. The (*) best describes an unknown genera/species.
** = GC Subgroup A subspecies
*** = GC Subgroup B subspecies
**** = tessellarius subspecies In-situ bioremedial processes that may be used in accordance with the present invention include the injection of non-indigenous butane-utilizing microorganisms into the surface or subsurface and/or the use of indigenous butane-utilizing microorganisms. Indigenous microorganisms can be stimulated to flourish by the addition of nutrients and a growth substrate that may be limited in the ecosystem under scrutiny. For aerobic metabolism, oxygen is usually in limited concentrations. The growth of butane-utilizing bacteria may be enhanced through the addition of butane, oxygen and, optionally, bacterial nutrients in any subsurface environment in which PCBs have been introduced, thereby creating an effective treatment zone. Butane, oxygen and optional bacterial nutrients such as inorganic and organic nitrogen-containing compounds and phosphorous-containing compounds can be delivered into the subsurface through injection or diffusion wells or some other type of delivery system. Alternatively, non-indigenous strains of butane-utilizing organisms may be injected into a subsurface environment. The butane-utilizing organisms of the present invention may be applied in-situ in saline or low pH environments as well.

A preferred system and method of in-situ bioremediation which may be used to degrade PCB pollutants are described in U.S. patent application entitled "System and Method of In-Situ Bioremediation with Butane-Utilizing Bacteria" filed Mar. 24, 1999, which is incorporated herein by reference.

Furthermore, butane-utilizing organisms of the present invention may be provided in an ex-situ bioreactor capable of treating air, soil or groundwater (freshwater, saline or low pH) waste streams. The ex-situ bioreactor may be used in a batch-type process and/or in a continuous flow process.

For air or gas treatment, butane-utilizing bacteria may be grown in a bioreactor on any suitable type of packing material or substrate capable of withstanding turbulent gas streams. A gas stream laden with PCBs may be treated in a bioreactor. In this embodiment, treatment consists of passing the chlorinated air waste stream through the bioreactor in much the same fashion as conventional activated carbon systems, with the exception that the contaminants are not merely transferred but destroyed.

PCB-impacted soils may be bioremediated in accordance with the present invention with butane-utilizing organisms in an ex-situ bioreactor. This apparatus may agitate soil through mixing or fluidizing, thereby accelerating the volatilization of PCB which could be treated as an air waste stream described above. Another type of soil reactor may degrade PCB pollutants in a bioreactor capable of treating a soil slurry matrix through either the introduction of non-indigenous butane-utilizing bacteria, or the stimulation of indigenous butane-utilizing bacteria. Oxygen, nutrients including alternate limited carbon and nitrogen sources such as casamino acids and yeast and butane may be introduced into this type of bioreactor. The use of surfactants may accelerate the removal of the PCB pollutants from the soil matrix thereby lower treatment time and increasing bioreactor performance.

In accordance with an embodiment of the present invention, an ex-situ bioreactor as described in U.S. patent application Ser. No. 08/767,750 may be used to restore surface water or groundwater impacted with PCB pollutants, by employing butane-utilizing bacteria. The impacted water may comprise fresh water, salt water, low pH water or the like. The ex-situ bioreactor may comprise one or multiple chambers, each housing a substrate such as biofilm fabric or packing material seeded with specific strains or a consortia of butane-utilizing bacteria. Each bioreactor chamber preferably comprises an oxygen, nutrient and butane gas delivery system. Bioreactor systems employing butane-utilizing organisms that demonstrate the ability to use PCB as a direct food source may not require the introduction of butane. However, in a cometabolic system, timers are preferably included to regulate the introduction of the butane, thereby reducing the likelihood of saturating the enzyme sites which would result in a lower contaminant destruction rate.

In addition to batch-type processes, the bioreactors may also operate by continuous flow techniques. PCB removal efficiency may be increased substantially by controlling process parameters such as increasing biofilm surface area with the medium, improving butane and oxygen delivery systems and adjusting adequate conditions for optimum bacterial growth. Various other support media, i.e., non-metallic screens, pellets, beads, etc., for the biofilm in the bioreactors listed above may provide a larger surface area for biofilm formation prior to the treatment phase. Other types of support media may also optimize bacterial growth and surface to volume ratio in the bioreactor thus improving biodegradation conditions, and effectively reducing the required residence times within the bioreactor. Greater performance may be achieved by utilizing effective oxygen and growth substrate delivery systems such as sparging. This can be accomplished by reducing bubble size during sparging which would increase the availability of the compounds to the microorganism inside the bioreactor. In certain cases, it may be desirable to reduce the negative effects of extremely stressed influent streams to the bioreactor by pre-adjusting pH, temperature and other related physico-chemical parameters.

Whereas particular embodiments of this invention have been described above for purposes of illustration, it will be evident to those skilled in the art that numerous variations of the details of the present invention may be made without departing from the invention as defined in the appended claims.

What is claimed is:

1. A method of degrading a PCB pollutant, the method comprising treating the PCB pollutant with butane-utilizing bacteria in the presence of butane and oxygen for a treatment time sufficient for the butane-utilizing bacteria to degrade the PCB pollutant, wherein the butane is provided as a butane substrate comprising butane as the most prevalent compound of the substrate.

2. The method of claim 1, further comprising providing butane to the butane-utilizing bacteria during a portion of the treatment time.

3. The method of claim 1, wherein the butane is provided at a substantially constant rate.

4. The method of claim 3, wherein the butane is provided for substantially the entire treatment time.

5. The method of claim 1, wherein the butane is provided in pulses.

6. The method of claim 1, wherein the butane is provided as a butane substrate comprising at least about 10 weight percent butane.

7. The method of claim 1, wherein the butane is provided as a butane substrate comprising at least about 50 weight percent butane.

8. The method of claim 1, wherein the butane is provided as a butane substrate comprising at least about 90 weight percent butane.

9. The method of claim 1, wherein the butane is provided as a butane substrate comprising at least about 99 weight percent n-butane.

10. The method of claim 1, wherein the oxygen is provided to the butane-utilizing bacteria for substantially the entire treatment time.

11. The method of claim 1, wherein the oxygen is provided to the butane-utilizing bacteria periodically.

12. The method of claim 1, wherein the oxygen is provided as air.

13. The method of claim 1, wherein the butane-utilizing bacteria comprises at least one bacterium selected from the group consisting of Pseudomonas, Variovorax, Nocardia, Chryseobacterium, Comamonas, Acidovorax, Rhodococcus, Aureobacterium, Micrococcus, Aeromonas, Stenotrophomonas, Sphingobacterium, Shewanella, Phyllobacterium, Clavibacter, Alcaligenes, Gordona, Corynebacterium and Cytophaga.

14. The method of claim 1, wherein the butane-utilizing bacteria comprises at least one bacterium selected from the group consisting of *putida, rubrisubalbicans, aeruginosa, paradoxus, asteroides, brasiliensis, restricta, globerula, indologenes, meningosepticum, acidovorans, delafleldii, rhodochrous, erythropolis, fascians, barkeri, esteroaromaticum, saperdae, varians, kristinae, caviae, maltophilia, thalpophilum, spiritivorum, putrefaciens B, myrsinacearum, michiganense, xylosoxydans, terrae, aquaticum B* and *johnsonae*.

15. The method of claim 1, wherein the butane-utilizing bacteria comprises at least one bacterium selected from the group consisting of *Pseudomonas rubrisubalbicans, Pseudomonas aeruginosa, Variovorax paradoxus, Nocardia asteroides, Nocardia restricta, Chryseobacterium indologenes, Comamonas acidovorans, Acidovorax delafieldii, Rhodococcus rhodochrous, Rhodococcus erythropolis, Aureobacterium esteroaromaticum, Aureobacterium saperdae, Micrococcus varians, Micrococcus kristinae, Aeromonas caviae, Stenotrophomonas maltophilia, Sphingobacterium thalpophilum, Clavibacter michiganense, Alcaligenes xylosoxydans, Corynebacterium aquaticum B* and *Cytophaga johnsonae*.

16. The method of claim 1, wherein the PCB pollutant is present within soil.

17. The method of claim 16, wherein the soil initially comprises greater than about 10 ppm of the PCB pollutant.

18. The method of claim 16, wherein the soil comprises less than about 2 ppm of the PCB pollutant after the treatment with the butane-utilizing bacteria.

19. The method of claim 16, wherein the soil comprises less than about 1 ppm of the PCB pollutant after the treatment with the butane-utilizing bacteria.

20. The method of claim 1, wherein the PCB pollutant is present in a gas.

21. The method of claim 20, wherein the gas is air.

22. The method of claim 1, wherein the PCB pollutant is present in a liquid.

23. The method of claim 22, wherein the liquid comprises water.

24. The method of claim 23, wherein the water comprises less than about 0.5 ppb of the PCB pollutant after the treatment with the butane-utilizing bacteria.

25. The method of claim 1, wherein the PCB pollutant is treated in-situ at a contaminated site.

26. The method of claim 1, wherein the PCB pollutant is treated ex-situ in a bioreactor.

27. A method of treating a site contaminated with a PCB pollutant comprising:

supplying a butane substrate comprising butane as the most prevalent compound of the substrate to the contaminated site; and supplying an oxygen-containing gas to the contaminated site.

28. The method of claim 27, wherein the butane substrate comprises at least about 10 weight percent butane.

29. The method of claim 27, wherein the butane substrate comprises at least about 50 weight percent butane.

30. The method of claim 27, wherein the butane substrate comprises at least about 90 weight percent butane.

31. The method of claim 27, wherein the butane substrate comprises at least about 99 weight percent n-butane.

32. A method of degrading a PCB pollutant, the method comprising treating the PCB pollutant with butane-utilizing bacteria and the presence of butane and oxygen for a treatment time sufficient for the butane-utilizing bacteria to degrade the PCB pollutant, wherein the butane is provided as a butane substrate comprising at least about ten weight percent butane.

* * * * *

UNITED STATES PATENT AND TRADEMARK OFFICE
CERTIFICATE OF CORRECTION

PATENT NO. : 6,156,203
APPLICATION NO. : 09/275324
DATED : December 5, 2000
INVENTOR(S) : Felix Anthony Perriello It is certified that error appears in the above-identified patent and that said Letters Patent is hereby corrected as shown below:

Cover Page item [76], Inventors
"Felix Anthony" should read -- Felix Anthony Perriello --

Cover Page item [56], Other Publications, Column 2, line 21
"tert" should read -- *tert* -- both occurrences

Cover Page item [56], Other Publications, Column 2, line 21
"ter-t" should read -- *tert* --

Cover Page item [57], Abstract, Lines 10 - 15
"Pseudomonas, Varivorax, Nocardia, Chryseobacterium, Comamonas, Acidovorax, Rhodococcus, Aureobacterium, Micrococcus, Aeromonas, Stenotrophomonas, Sphingobacterium, Shewanella, Phyllobacterium, Clavibacter, Alcaligenes, Gordona, Corynebacterium and Cytophaga." should read -- *Pseudomonas, Varivorax, Nocardia, Chryseobacterium, Comamonas, Acidovorax, Rhodococcus, Aureobacterium, Micrococcus, Aeromonas, Stenotrophomonas, Sphingobacterium, Shewanella, Phyllobacterium, Clavibacter, Alcaligenes, Gordona, Corynebacterium* and *Cytophaga.* --

DETAILED DESCRIPTION OF THE PREFERRED EMBODIMENTS

Column 2, Line 65
"Pseudomonadaceae" should read -- *Pseudomonadaceae* --

UNITED STATES PATENT AND TRADEMARK OFFICE
CERTIFICATE OF CORRECTION

PATENT NO.         : 6,156,203
APPLICATION NO. : 09/275324
DATED                  : December 5, 2000
INVENTOR(S)       : Felix Anthony Perriello It is certified that error appears in the above-identified patent and that said Letters Patent is hereby corrected as shown below:

Column 2, Line 67 - Column 3, Line 6
"Pseudomonas, Varivorax; Nocardia; Chryseobacterium; Comamonas; Acidovorax; Stenotrophomonas; Sphingobacterium; Xanthomonas; Frateuria; Zoogloae; Alcaligenes; Flavobacterium; Derxia; Lampropedia; Brucella; Xanthobacter; Thermus; Thennomicrobium; Halomonas; Alteromonas; Serpens; Janthinobacterium; Bordetella; Paracoccus; Beijerinckia; and Francisella." should read -- *Pseudomonas, Varivorax; Nocardia; Chryseobacterium; Comamonas; Acidovorax; Stenotrophomonas; Sphingobacterium; Xanthomonas; Frateuria; Zoogloae; Alcaligenes; Flavobacterium; Derxia; Lampropedia; Brucella; Xanthobacter; Thermus; Thennomicrobium; Halomonas; Alteromonas; Serpens; Janthinobacterium; Bordetella; Paracoccus; Beijerinckia;* and *Francisella.* --

Column 3, Line 7
"Nocardioform Actinomycetes" should read -- *Nocardioform Actinomycetes* --

Column 3, Line 8
"Eubactema and Actinomycetes" should read -- *Eubactema* and *Actinomycetes* --

Column 3, Lines 9 - 12
"Nocardia; Rhodococcus; Gordona; Nocardioides; Saccharopolyspora; Micropolysora; Promicromonospora; Intrasporangium; Pseudonocardia; and Oerskovia." should read -- *Nocardia; Rhodococcus; Gordona; Nocardioides; Saccharopolyspora; Micropolyspora; Promicromonospora; Intrasporangium; Pseudonocardia;* and *Oerskovia.* --

Column 3, Line 13
"Micrococcaceae" should read -- *Micrococcaceae* --

Column 3, Lines 14 - 18
"Micrococcus; Stomatococcus; Planococcus Staphylococcus; Aerococcus; Peptococcus; Peptostreptococcus; Coprococcus; Gemella; Pediococcus; Leuconostoc; Ruminococcus; Sarcina; and Streptococcus." should read -- *Micrococcus; Stomatococcus; Planococcus Staphylococcus; Aerococcus; Peptococcus; Peptostreptococcus; Coprococcus; Gemella; Pediococcus; Leuconostoc; Ruminococcus; Sarcina;* and *Streptococcus.* --

UNITED STATES PATENT AND TRADEMARK OFFICE
CERTIFICATE OF CORRECTION

PATENT NO.         : 6,156,203
APPLICATION NO. : 09/275324
DATED                  : December 5, 2000
INVENTOR(S)       : Felix Anthony Perriello It is certified that error appears in the above-identified patent and that said Letters Patent is hereby corrected as shown below:

Column 3, Line 19
"Vibrionaceae" should read -- *Vibrionaceae* --

Column 3, Lines 21 - 23
"Aeromonas; Photobacterium; Vibrio; Plesiomonas; Zymomonas; Chromobacterium; Cardiobacterium; Calymmatobacterium; Streptobacillus; Eikenella; and Gardnerella." should read -- *Aeromonas; Photobacterium; Vibrio; Plesiomonas; Zymomonas; Chromobacterium; Cardiobacterium; Calymmatobacterium; Streptobacillus; Eikenella;* and *Gardnerella.* --

Column 3, Line 24
"Rhizobiaceae" should read -- *Rhizobiaceae* --

Column 3, Lines 26 -27
"Phyllobacterium; Rhizobium; Bradyrhizobium; and Agrobacterium." should read -- *Phyllobacterium; Rhizobium; Bradyrhizobium;* and *Agrobacterium.* --

Column 3, Line 28
"Cytophagaceae" should read -- *Cytophagaceae* --

Column 3, Lines 30 - 32
"Cytophaga; Flexibacter; Saprospira; Flexithrix; Herpetosiphon; Capnocytophaga; and Sporocytophaga." should read -- *Cytophaga; Flexibacter; Saprospira; Flexithrix; Herpetosiphon; Capnocytophaga;* and *Sporocytophaga.* --

Column 3, Line 33
"Corynebacterium" should read -- *Corynebacterium* --

UNITED STATES PATENT AND TRADEMARK OFFICE
CERTIFICATE OF CORRECTION

PATENT NO. : 6,156,203
APPLICATION NO. : 09/275324
DATED : December 5, 2000
INVENTOR(S) : Felix Anthony Perriello It is certified that error appears in the above-identified patent and that said Letters Patent is hereby corrected as shown below:

Column 3, Lines 35 - 39
"Aureobacterium; Agromyces; Arachnia; Rothia; Acetobacterium; Actinomyces; Arthrobactera; Arcanobacterium; Lachnospira; Propionibacterium; Eubacterium; Butyrivibria; Brevibacterium; Bifidobacterium; Microbacterium; Casobacter; and Thermoanaerobacter." should read -- *Aurobacterium; Agromyces; Arachnia; Rothia; Acetobacterium; Actinomyces; Arthrobactera; Arcanobacterium; Lachnospira; Propionibacterium; Eubacterium; Butyrivibria; Brevibacterium; Bifidobacterium; Microbacterium; Casobacter;* and *Thermoanaerobacter.* --

Column 4, Line 18
"$FeCl_3 6H_2O$" should read -- $FeCl_3\text{-}6H_2O$ --

Column 4, Line 30
"$H_3BO_4$" should read -- $H_3BO4$ --

Column 4, Line 32
"$(NH_4)_6Mo_7O_{24}\text{-}4_2O$" should read -- $(NH_4)_6Mo_7O_{24}\text{-}4H_2O$ --

Column 4, Line 54
after "C" delete "."

UNITED STATES PATENT AND TRADEMARK OFFICE
CERTIFICATE OF CORRECTION

| | |
|---|---|
| PATENT NO. | : 6,156,203 |
| APPLICATION NO. | : 09/275324 |
| DATED | : December 5, 2000 |
| INVENTOR(S) | : Felix Anthony Perriello |

It is certified that error appears in the above-identified patent and that said Letters Patent is hereby corrected as shown below:

Claims

Claim 14 - Column 14, Line 45
"delafleldii" should read -- delafieldii --

Signed and Sealed this

Twenty-fourth Day of February, 2009

JOHN DOLL
*Acting Director of the United States Patent and Trademark Office*